United States Patent [19]

Austin

[11] Patent Number: 5,059,322
[45] Date of Patent: Oct. 22, 1991

[54] APPARATUS FOR DEWATERING SLUDGE

[75] Inventor: Eric P. Austin, Sandbach, England

[73] Assignee: Simon-Hartley Limited, Stoke-on-Trent, England

[21] Appl. No.: 514,293

[22] Filed: Apr. 25, 1990

[30] Foreign Application Priority Data

Apr. 26, 1989 [GB] United Kingdom ............... 8909463

[51] Int. Cl.⁵ ............................................. B01D 33/46
[52] U.S. Cl. .................................... 210/396; 210/400
[58] Field of Search ............ 210/396, 400, 391, 407, 210/783, 791; 100/112, 118

[56] References Cited

U.S. PATENT DOCUMENTS

| 4,354,935 | 10/1982 | Austin et al. | 210/396 |
| 4,729,836 | 3/1988 | Ickinger et al. | 210/396 |
| 4,731,188 | 3/1988 | Johnson et al. | 210/396 |

FOREIGN PATENT DOCUMENTS

| 247499 | 12/1985 | Japan | 210/396 |
| 2068761 | 8/1981 | United Kingdom | 210/396 |

Primary Examiner—Robert A. Dawson
Assistant Examiner—Matthew O. Savage
Attorney, Agent, or Firm—Nies, Kurz, Bergert & Tamburro

[57] ABSTRACT

Apparatus for dewatering sludge comprising a moving foraminous conveyor belt (10) driven in a single direction with a horizontal conveying run (11). Sludge to be dewatered is fed onto the belt at an input end of the conveying run so that liquid may drain from the sludge through the belt. Part way along the belt is disposed at least on ramp (21) having its lower edge in contact with or just above the belt surface to cause sludge to rise up the ramp thus enhancing the dewatering process. A plurality of spaced fingers (26) extend forwardly from the top of the ramp (21) thus leaving strips of the belt (20) free of sludge forwardly of the ramp and fingers.

4 Claims, 2 Drawing Sheets

APPARATUS FOR DEWATERING SLUDGE

This invention concerns apparatus for dewatering sludge particularly, though by no means exclusively, activated sludge.

Certain devices are known for carrying out this function which include a horizontally disposed moving foraminous conveying belt onto which the sludge is fed at one end of the conveying run so that the liquid may drain from the sludge through the belt.

In some systems, after initial drainage, the sludge is passed between a pair of such belts which are then led progressively around a number of rollers such that the sludge is squeezed between the belts, and the liquid escapes into a collecting trough below the rollers. Finally, the thickened sludge is discharged from between the belts for collection and disposal.

It is during passage over the initial conveying run that a large proportion of the liquid escapes freely from the sludge, and to enhance this process it is known to cause the sludge to pass over or around a number of obstructions above the belt. This causes particles of sludge to move relative to one another with a shearing action thus releasing further liquids.

In particular, one such device comprises a ramp which is supported above the belt with its lower end almost in contact with same, and rising to a height above the layer of sludge on the belt. The ramp serves as an obstruction causing a build up of sludge behind it so that the sludge must rise up from the belt onto the ramp with a backwards rolling action causing release of further liquids before descending from the upper edge of the ramp onto the belt.

An object of the present invention is to provide apparatus of this kind in which drainage through the interstices of the belt is enhanced.

According to the present invention, there is provided apparatus for dewatering sludge, comprising a moving foraminous conveying belt driven in a single direction and arranged with a substantially horizontal conveying run, means for feeding sludge onto the belt at an input end of the conveying run so that liquid in the sludge may drain through the belt, and at least one ramp disposed above the belt and directed upwardly from a level on or adjacent the conveying surface thereof, for restricting forwards movement of the sludge and for causing the sludge to leave the belt and rise up the ramp before falling from an upper edge thereof forwards onto the belt, characterised by a plurality of spaced fingers extending forwardly from the upper edge of the ramp by a distance sufficient to prevent sludge which advances onto the fingers from falling immediately back onto the belt beneath the fingers.

An embodiment of the invention will now be described, by way of example only, with reference to the accompanying schematic drawings in which.

Figure 1:
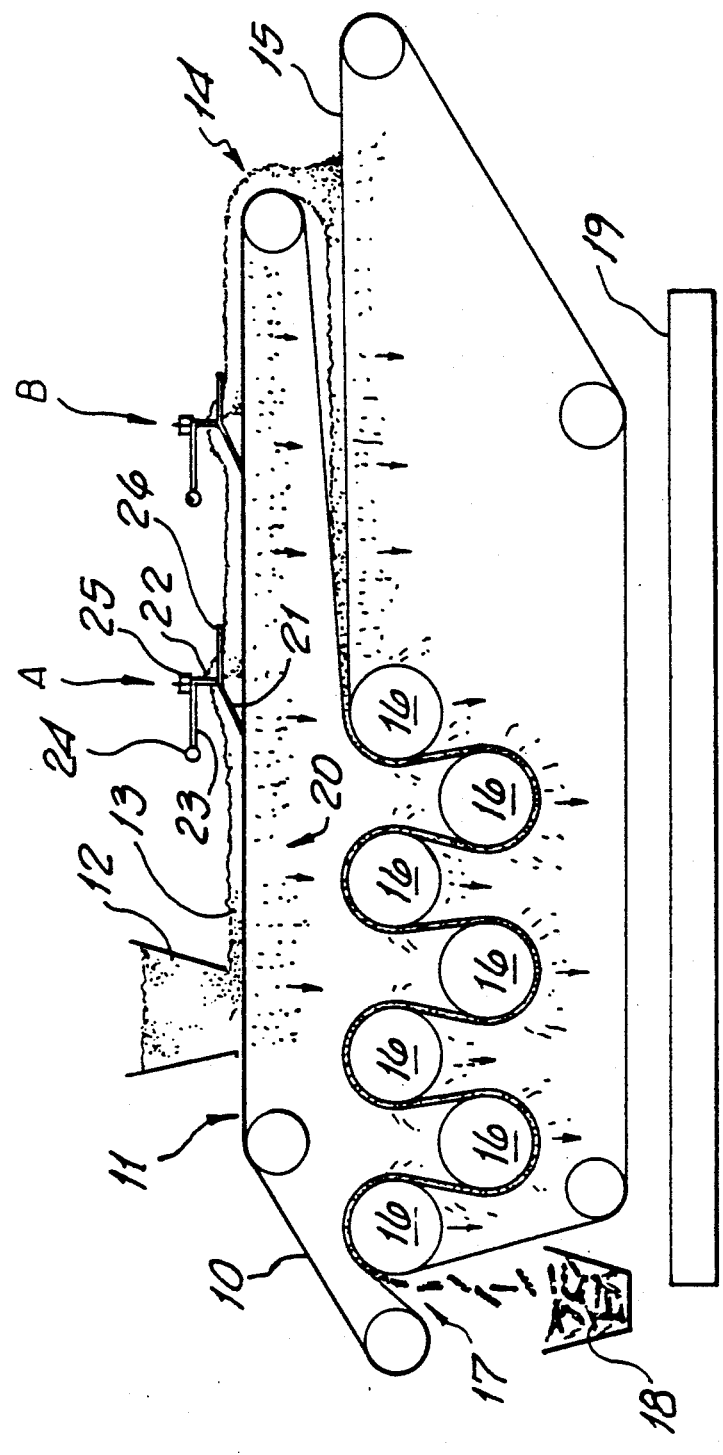
FIG. 1 is a general arrangement of apparatus for dewatering sludge incorporating the invention.

Referring now to the drawings, FIG. 1 illustrates a sludge dewatering press in which a first endless foraminous conveying belt 10 provides an upper conveying run 11 onto which sludge is deposited from a hopper 12 as a shallow layer 13. After leaving the output end 14 of the conveying run 11 the sludge is deposited onto a second foraminous conveying belt 15 and is then squeezed between the two belts before passing around a number of perforated drums or rollers 16 arranged progressively to lead the belts with the sludge therebetween in a serpentine configuration before they are drawn apart in an outlet region 17 from which the thickened sludge falls into a collection container 18. During passage between the belts, the sludge is progressively squeezed to free as much water as possible, all of which is collected in a trough 19 below the apparatus.

When the sludge is first deposited onto the upper run 11 of the belt there is an initial flush of water from between the particles of the sludge and this drains as shown at 20 directly through the belt. To enhance this drainage it is advantageous to interrupt the flow of sludge using obstructions which cause the particles of sludge to move relative to one another with a shearing action thus releasing further water.

In accordance with the present invention, there is provided, at each of two positions A and B a ramp 21 which extends across the belt with its lower edge disposed on or adjacent the surface of the belt and rising to a level above the sludge layer 13 so that passage of the sludge is restricted causing it to build up behind the ramp 21 which in turn causes the particles of sludge rising up the ramp to experience a backwards rolling action thus releasing further water. The sludge passes over the upper edge of the ramp and falls forwardly onto the belt once again. This action is repeated at the next position B where a further ramp is provided, and there may be more than two ramps at spaced intervals along the length of the conveying run 11.

Each ramp 21 is supported on a pair of vertical arms 22 each attached to a horizontal arm 23 which itself is pivotally mounted on rod 24 extending across the machine between frame members thereof. One or more weights 25 are provided at the top of vertical arm 22 to maintain the bottom edge of the ramp in contact with or at the correct position with respect to the belt.

Figure 2:
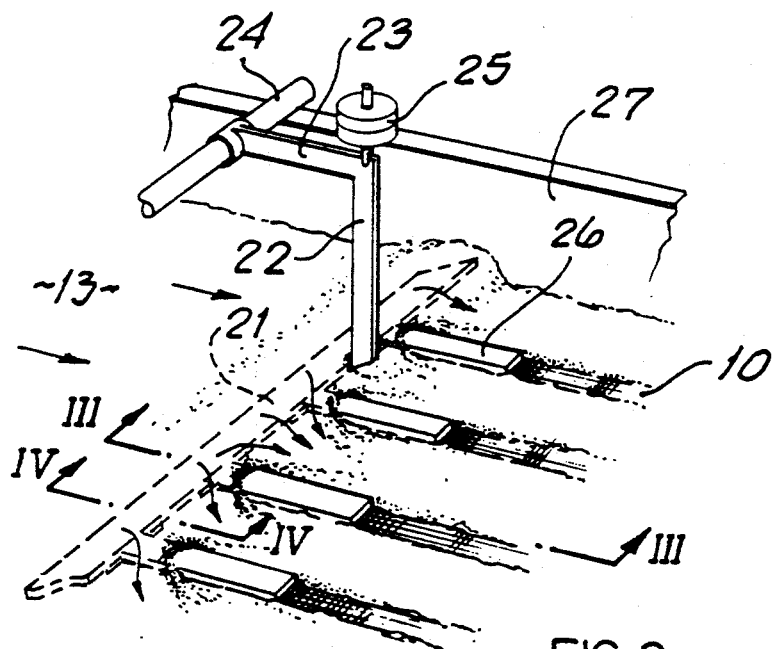
FIG. 2 is a detailed perspective view of part of the apparatus of FIG. 1.
Figures 3, 4:
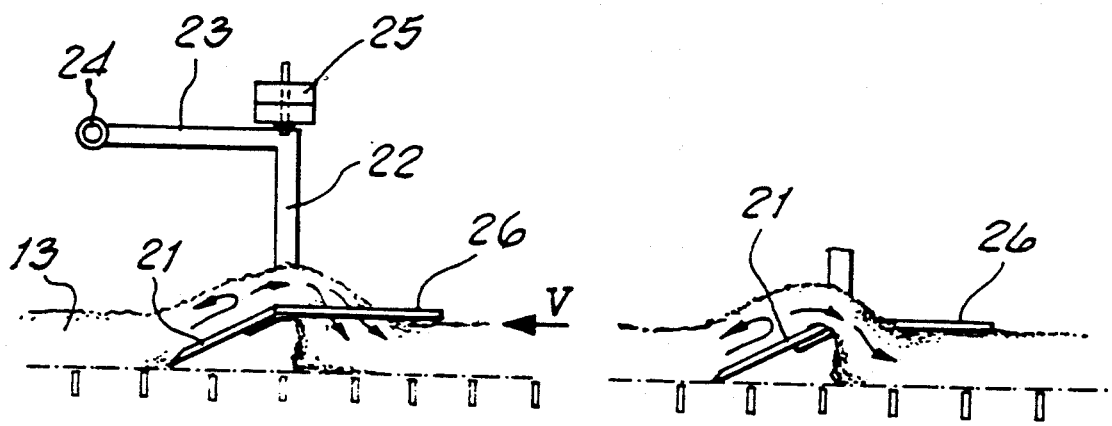
FIG. 3 is a vertical section through the apparatus and taken along line III—III of FIG. 2.
FIG. 4 is a similar view taken along line IV—IV of FIG. 2.
Figure 5:
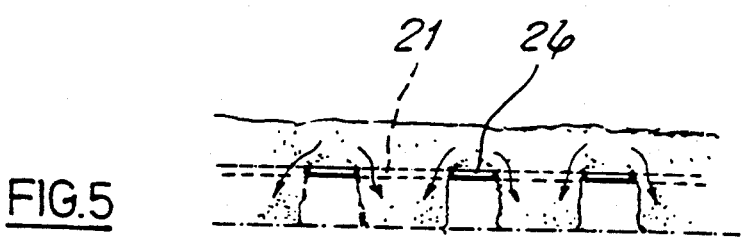
FIG. 5 is a vertical sectional view in the direction of arrow V in FIG. 3.

Extending forwardly from the upper edge of each ramp 21 at spaced positions along its length are several fingers 26 so that sludge moving forwardly from the upper edge of the ramp and which advances onto the fingers is prevented from falling immediately back onto the belt beneath the fingers. In this way, as will be seen from FIGS. 2 and 5 strips of belt remain free of sludge so that water may drain more readily through the belt in these regions. The strips remain free for a certain distance downstream of each set of fingers before the sludge flows back into a homogeneous layer before arriving at the base of the next ramp.

In a typical embodiment of the invention, the width of the layer 13 of sludge is in the region of one meter and is usually contained by a pair of side guides 27. Therefore, each ramp 21 is of similar length extending across the entire layer of sludge. The height from top to bottom of the ramp is approximately 40 mm, and the fingers 26 which are spaced apart by a distance of approximately 130 mm are some 30 mm wide and in the region of 75 mm in length, i.e. approximately twice the height from top to bottom of the ramp.

The vertical arms 22 are fixed to ramp 21 at spaced positions along its length, and the common pivotal rod 24 supporting arms 22 and 23 is mounted in bearings attached to support brackets in the machine framework outside of the side guides 27.

It is not intended to limit the invention to the above example only, many variations such as might readily occur to one skilled in the art being possible without departing from the scope thereof. For example, the length of the fingers on each ramp may be greater or lesser than referred to. The fingers may be configured to encourage the sludge to pass rapidly over the sides of the fingers to prevent it from reaching their ends. Alternatively, an end stop or plough may be provided on each finger to ensure that sludge cannot fall directly onto the belt from the finger ends.

The ramp and finger assemblies may be made from any appropriate material including plastics, and the weights 25 may be replaced by other means urging the horizontal arms 23 to pivot downwardly with respect to the associated rod 24.

I claim:

1. Apparatus for dewatering sludge comprising a moving foraminous conveying belt driven in a single direction and arranged with a substantially horizontal conveying run having input and output ends, means for feeding sludge onto the belt at the input end of the conveying run so that liquid in the sludge may drain through the belt during conveyance, at least one inclined ramp disposed above the belt at a position between the input and output ends thereof and sloping upwardly in a direction towards said output end from a level on or adjacent the conveying surface thereof, for restricting forwards movement of the sludge and for causing the sludge to leave the belt and rise up the ramp before falling from an upper edge thereof towards said output end onto the belt, and a plurality of spaced fingers spaced above said belt and extending from an upper edge region of the ramp in the direction of conveyance by a distance sufficient to prevent sludge which advances onto the fingers from falling immediately back onto the belt beneath the fingers.

2. Apparatus according to claim 1, wherein said at least one ramp is suspended above the belt by at least one pivotal arm, and including adjustable means to maintain a bottom edge of the ramp in contact with or at a predetermined position with respect to the belt.

3. Apparatus according to claim 1, wherein the height from top to bottom of said ramp is about 40 millimeters and the fingers are spaced apart by a distance of about 130 millimeters and are about 30 millimeters wide and about 75 millimeters in length.

4. Apparatus according to claim 1, wherein the length of each said finger is about twice the height from top to bottom of said ramp.

* * * * *